United States Patent
Yamauchi et al.

(10) Patent No.: US 12,460,027 B2
(45) Date of Patent: Nov. 4, 2025

(54) METHOD FOR PRODUCING POLYVINYL ALCOHOL RESIN

(71) Applicant: MITSUBISHI CHEMICAL CORPORATION, Tokyo (JP)

(72) Inventors: Yoshihito Yamauchi, Tokyo (JP); Norihito Sakai, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 718 days.

(21) Appl. No.: 17/939,418

(22) Filed: Sep. 7, 2022

(65) Prior Publication Data

US 2023/0002519 A1    Jan. 5, 2023

Related U.S. Application Data

(63) Continuation of application No. PCT/JP2021/013375, filed on Mar. 29, 2021.

(30) Foreign Application Priority Data

Mar. 30, 2020 (JP) .................. 2020-060379

(51) Int. Cl.
    C08J 3/12     (2006.01)
    C08F 16/06    (2006.01)

(52) U.S. Cl.
    CPC .................. *C08F 16/06* (2013.01)

(58) Field of Classification Search
    CPC ........... C08F 16/06; C08F 216/06; C08J 3/12
    See application file for complete search history.

(56) References Cited

U.S. PATENT DOCUMENTS

| | | | |
|---|---|---|---|
| 4,469,837 A | 9/1984 | Cattaneo | |
| 2004/0186232 A1 | 9/2004 | Shibutani | |
| 2005/0182233 A1 | 8/2005 | Weinhold et al. | |
| 2019/0300627 A1 | 10/2019 | Nishimura et al. | |
| 2020/0087465 A1 | 3/2020 | Fukamachi et al. | |
| 2020/0123296 A1 | 4/2020 | Amano et al. | |

FOREIGN PATENT DOCUMENTS

| | | |
|---|---|---|
| EP | 0 473 038 A1 | 3/1992 |
| EP | 1 443 060 A1 | 8/2004 |
| JP | H2-057305 A | 2/1990 |
| JP | H2-301409 A | 12/1990 |
| JP | H4-261451 A | 9/1992 |
| JP | H5-093023 A | 4/1993 |
| JP | 2003-285321 A | 10/2003 |
| JP | 2004-250695 A | 9/2004 |
| JP | 2007-519546 A | 7/2007 |
| JP | 2010-001370 A | 1/2010 |
| WO | 2018/221743 A1 | 12/2018 |
| WO | 2019/004455 A1 | 1/2019 |

OTHER PUBLICATIONS

European Search Report mailed Jul. 27, 2023, issued in European Patent Application No. 21782110.7.
Office Action dated Aug. 14, 2023 issued in Chinese patent application No. 202180020225.1, with English machine translation thereof.
Japanese Office Action dated Sep. 10, 2024, issued in Japanese patent application No. 2022-512231, with English machine translation thereof.
ISR issued in International Patent Application No. PCT/JP2021/013375, Jun. 8, 2021, translation.
IPRP issued in International Patent Application No. PCT/JP2021/013375, Sep. 29, 2022, translation.

*Primary Examiner* — James Sanders
(74) *Attorney, Agent, or Firm* — GREENBLUM AND BERNSTEIN, P.L.C.

(57) ABSTRACT

A method for producing a polyvinyl alcohol resin having an absorbance of not less than 0.2 at 280 nm, which includes: melt-kneading a polyvinyl alcohol resin material; extruding the resulting melt-kneaded polyvinyl alcohol resin into a sheet; cooling the resulting polyvinyl alcohol resin sheet; and pulverizing the cooled polyvinyl alcohol resin sheet. The method ensures a higher productivity and an excellent long-run property.

3 Claims, No Drawings

METHOD FOR PRODUCING POLYVINYL ALCOHOL RESIN

RELATED APPLICATIONS

This application is a continuation of International Application No. PCT/JP2021/013375, filed on Mar. 29, 2021, which claims priority to Japanese Patent Application No. 2020-060379, filed on Mar. 30, 2020, the entire contents of each of which being herein incorporated by reference.

TECHNICAL FIELD

The present disclosure relates to a method for producing a polyvinyl alcohol resin and, more specifically, to a polyvinyl alcohol resin production method ensuring a higher productivity and an excellent long-run property.

BACKGROUND ART

Conventionally, a polyvinyl alcohol resin having conjugated double bonds in its molecule is used as a dispersant for suspension polymerization of a vinyl compound such as vinyl chloride. The polyvinyl alcohol resin having conjugated double bonds in its molecule is typically prepared by heat-treating a polyvinyl alcohol resin or a carbonyl-containing polyvinyl alcohol resin to generate double bonds therein through fatty acid elimination (e.g., acetic acid elimination).

PTL 1, for example, discloses that a polyvinyl alcohol resin having conjugated double bonds in its molecule is prepared by melt-kneading a carbonyl-containing polyvinyl alcohol resin for heat treatment and extruding the resulting melt into a strand by means of an extruder, and pulverizing the resulting strand. The amount of the conjugated double bonds can be determined based on an absorbance used as an index.

RELATED ART DOCUMENT

Patent Document

PTL 1: JP-A-2004-250695

SUMMARY

However, the polyvinyl alcohol resin production method disclosed in PTL 1 fails to ensure very high productivity and, therefore, requires further improvement to increase the productivity. That is, the polyvinyl alcohol resin is water-soluble, so that the strand of the polyvinyl alcohol resin extruded from the extruder cannot be cooled with water but should be cooled with air. This makes it difficult to improve the productivity. If the extrusion rate of the extruder is increased for the improvement of the productivity, the amount of the polyvinyl alcohol resin is increased and the heat amount of the polyvinyl alcohol resin is also increased. Therefore, an ordinary air-cooling method cannot ensure sufficient cooling, making it difficult to cut or pulverize the extruded strand, sheet, or the like. Further, gelation is liable to occur around an extrusion part of the extruder to thereby deteriorate the long-run property.

The present disclosure provides a polyvinyl alcohol resin production method ensuring a higher productivity and an excellent long-run property.

In view of the foregoing, the inventors conducted intensive studies and, as a result, found that, where the melt-kneaded polyvinyl alcohol resin is extruded into a sheet but not into the strand and the resulting polyvinyl alcohol resin sheet is cooled, the aforementioned problem can be solved.

The present disclosure has the following features [1] to [4].

[1] A method for producing a polyvinyl alcohol resin having an absorbance of not less than 0.2 at 280 nm, the polyvinyl alcohol resin production method including: melt-kneading a polyvinyl alcohol resin material and extruding a resulting melt into a polyvinyl alcohol resin sheet; cooling the polyvinyl alcohol resin sheet; and pulverizing the cooled polyvinyl alcohol resin sheet.

[2] In the polyvinyl alcohol resin production method according to Item [1], the polyvinyl alcohol resin material is a carbonyl-containing polyvinyl alcohol resin.

[3] In the polyvinyl alcohol resin production method according to Item [1] or [2], the cooling the polyvinyl alcohol resin sheet is sandwiching the polyvinyl alcohol resin sheet between belt coolers for the cooling.

[4] In the polyvinyl alcohol resin production method according to any one of Items [1] to [3], the polyvinyl alcohol resin is a polyvinyl alcohol resin to be used as a dispersant for suspension polymerization of a vinyl compound.

According to the present disclosure, the method for producing the polyvinyl alcohol resin having an absorbance of not less than 0.2 at 280 nm includes the steps of melt-kneading the polyvinyl alcohol resin material and extruding the resulting melt into a sheet; cooling the resulting polyvinyl alcohol resin sheet; and pulverizing the cooled polyvinyl alcohol resin sheet. Thus, the polyvinyl alcohol resin is extruded into the sheet but not into the strand, unlike in the conventional art, so that the extrusion rate of the extruder can he increased to thereby improve the productivity. Further, where the resin is extruded into the sheet but not into the strand, the resin is less liable to stagnate around the extrusion part even with an increased extrusion rate, thereby ensuring an excellent long-run property. Since the polyvinyl alcohol resin sheet has a greater surface area, the sheet can be highly efficiently cooled to a temperature that permits the pulverization of the polyvinyl alcohol resin. Therefore, even if the extrusion rate of the extruder is increased and, hence, the extruded polyvinyl alcohol resin has a higher heat amount, the polyvinyl alcohol resin can be efficiently cooled and pulverized. That is, the pulverized polyvinyl alcohol resin can be produced with a higher productivity. The polyvinyl alcohol resin produced by the production method of the present disclosure is useful as a dispersant for suspension polymerization of a vinyl compound, particularly vinyl chloride.

DESCRIPTION OF EMBODIMENTS

Embodiments of the present disclosure will hereinafter be described in detail by way of example.

The polyvinyl alcohol (hereinafter referred to as "PVA") resin produced by the production method of the present disclosure is mainly used as a dispersant for suspension polymerization of a vinyl compound, and is a PVA resin produced by introducing conjugated double bonds into the PVA resin material. Prior to the description of the production method of the present disclosure, the PVA resin material to be used in the production method of the present disclosure will be described.

[PVA Resin Material]

The PVA resin material to be used in the production method of the present disclosure is not particularly limited, but is preferably a PVA resin containing carbonyl groups in its molecule because the conjugated double bonds can be efficiently introduced into the molecule.

A method for producing the carbonyl-containing PVA resin is not particularly limited, but known examples of the method include:

(1) a method in which a polyvinyl ester resin prepared by polymerizing a vinyl ester compound is saponified, and the resulting PVA resin is oxidized with an oxidizing agent such as hydrogen peroxide;

(2) a method in which a vinyl ester compound is polymerized in the presence of a chain transfer agent such as aldehyde or ketone containing a carbonyl group, and the resulting resin is saponified;

(3) a method in which a polyvinyl ester resin is produced by polymerizing a vinyl ester compound in the presence of 1-methoxyvinyl acetate, and is saponified; and (4) a method in which a polyvinyl ester resin is prepared by polymerizing a vinyl ester compound while blowing air into a reaction system of the polymerization, and then is saponified.

Of these, the method (2) is preferred from the viewpoint of the productivity. The preferred carbonyl-containing PVA resin production method (2) will be described in detail below.

Examples of the vinyl ester compound to be used for the polymerization include vinyl formate, vinyl acetate, vinyl trifluoroacetate, vinyl propionate, vinyl butyrate, vinyl caprate, vinyl laurate, vinyl versatate, vinyl palmitate, and vinyl stearate. Of these, vinyl acetate is preferably used. The vinyl ester compounds described above may be each used alone, or two or more of the vinyl ester compounds may be used in combination.

As a polymerization component other than the vinyl ester compound, an additional monomer polymerizable with the vinyl ester compound may be used in a proportion of not greater than 15 mol %, preferably not greater than 5 mol %, based on the amount of the polymerization component.

Examples of the additional monomer include: unsaturated carboxylic acids and alkyl esters of the unsaturated acids such as acrylic acid, methacrylic acid, crotonic acid, maleic acid, and monoalkyl maleates; nitriles and amides such as acrylonitrile, methacrylonitrile, acrylamide, and methacrylamide; olefin sulfonic acids such as ethylenesulfonic acid, allylsulfonic acid, and methallylsulfonic acid, and salts of these olefin sulfonic acids; vinyl esters other than vinyl esters of fatty acids, vinyl ethers, vinyl ketones, ethylene, a-olefins, vinyl halides, vinylidene halides, vinyl ethylene carbonate, and 3,4-diacetoxy-1-butene. These may be each used alone, or two or more of these may be used in combination.

Examples of the carbonyl-containing chain transfer agent such as aldehyde or ketone (hereinafter referred to simply as "chain transfer agent") include aldehydes such as acetaldehyde, propionaldehyde, n-butyraldehyde, benzaldehyde, and crotonaldehyde, and ketones such as acetone, methyl ethyl ketone, hexanone, and cyclohexanone. Of these, acetaldehyde, benzaldehyde, propionaldehyde, and n-butyraldehyde are preferred for easier control of the chain transfer of the vinyl ester compound to the carbonyl compound. These chain transfer agents may be each used alone, or two or more of these chain transfer agents may be used in combination.

The amount of the chain transfer agent to be added may be adjusted according to the chain transfer constant of the chain transfer agent and the polymerization degree of the PVA resin to be produced, and is preferably 0.1 to 5 wt. %, more preferably 0.5 to 3 wt. %, based on the weight of the polymerization component. The chain transfer agent may be fed in a batch at the initial stage of the polymerization, or may be fed in the middle of the polymerization. The molecular weight distribution of the PVA resin can be controlled by feeding the chain transfer agent by a desired method.

The method for polymerizing the vinyl ester compound is not particularly limited, but known examples of the polymerization method include solution polymerization, bulk polymerization, emulsion polymerization, and suspension polymerization. In particular, the solution polymerization is preferred.

An alcohol such as methanol, ethanol or isopropyl alcohol is typically used as a solvent for the solution polymerization. In the solution polymerization, the polymerization component may be fed dividedly or in a batch, or may be fed continuously or intermittently by given means.

Exemplary polymerization initiators to be used for the solution polymerization include known radical polymerization initiators such as azobisisobutyronitrile, acetyl peroxide, benzoyl peroxide, lauroyl peroxide, azobisdimethylvaleronitrile, and azobismethoxyvaleronitrile.

The reaction temperature for the polymerization is selected from a range of 40° C. to around the boiling point of the solvent.

The polyvinyl ester resin prepared in the aforementioned manner can be saponified by a known method. Typically, the polyvinyl ester resin is dissolved in an alcohol, and then saponified in the presence of an alkali catalyst or an acid catalyst. Examples of the alcohol include methanol, ethanol, butanol, and isopropanol, and solvent mixtures containing methyl acetate and any of these alcohols such as a solvent mixture containing methanol and methyl acetate. The concentration of the polyvinyl ester resin in the alcohol is selected from a range of 20 to 50 wt. %.

The saponification is preferably carried out in a solvent having a dielectric constant of not higher than 32 for control of a block character to be described later. Examples of the solvent having a dielectric constant of not higher than 32 include methanol (31.2), a solvent mixture (27.1) of methyl acetate/methanol=1/3 (weight ratio), a solvent mixture (21.0) of methyl acetate/methanol=1/1 (weight ratio), a solvent mixture (13.9) of methyl acetate/methanol=3/1 (weight ratio), methyl acetate (7.03), isopropyl acetate (6.3), trichloroethylene (3.42), xylene (2.37), toluene (2.38), benzene (2.28), and acetone (21.4).

Of these, methanol is preferably used. The parenthesized numerals represent the dielectric constants of the respective solvents.

Usable examples of the alkali catalyst include hydroxides and alcoholates of alkali metals such as sodium hydroxide, potassium hydroxide, sodium methylate, sodium ethylate, and potassium methylate.

Usable examples of the acid catalyst include aqueous solutions of inorganic acids such as hydrochloric acid and sulfuric acid, and organic acids such as p-toluenesulfonic acid.

The amount of the alkali catalyst or the acid catalyst to be used is preferably 1 to 100 mmol equivalent, more preferably 1 to 40 mmol equivalent, still more preferably 1 to 20 mmol equivalent, based on 1 mol of the vinyl ester compound. If the use amount of the alkali catalyst or the acid catalyst is excessively small, it tends to be difficult to increase the saponification degree to a desired saponification degree. If the use amount of the alkali catalyst or the acid catalyst is excessively great, the saponification degree tends to be much higher than the desired saponification degree.

The temperature for the saponification is not particularly limited, but is preferably 10° C. to 70° C., more preferably 20° C. to 50° C.

Exemplary saponification methods include a continuous saponification method to be performed on a carrier belt machine, and a batch saponification method. In the continuous saponification method, the saponification reaction is typically allowed to proceed for about 15 to about 20 minutes. In the batch saponification method, the saponification reaction is typically allowed to proceed for 2 to 3 hours.

The carbonyl-containing PVA resin prepared in the aforementioned manner preferably has a saponification degree of 65 to 98 mol %, more preferably 68 to 85 mol still more preferably 68 to 82 mol %. If the saponification degree is excessively low, the water dispersibility tends to be deteriorated. If the saponification degree is excessively high, the PVA resin to be used as a dispersant tends to have a reduced surface activity, thereby deteriorating the dispersibility of the vinyl compound. Therefore, blocks are liable to be generated during the suspension polymerization.

The carbonyl-containing PVA resin preferably has an average polymerization degree of 200 to 3,000, more preferably 400 to 1,200. If the average polymerization degree is excessively low, agglomeration is liable to occur with the protective colloid property excessively lowered in the suspension polymerization of the vinyl compound. If the average polymerization degree is excessively high, the polyvinyl resin prepared by the suspension polymerization tends to have a reduced plasticizer absorbability.

The carbonyl-containing PVA resin preferably has a carbonyl content of not less than 0.05 mol more preferably not less than 0.1 mol %, and preferably not greater than 0.5 mol %. If the carbonyl content is excessively low, the introduction of the conjugated double bonds tends to be insufficient in the melt-kneading to be described later, so that the PVA resin as the dispersant has a lower protective colloid property and the use amount of the dispersant is increased.

In the melt-kneading to be described later, some of 1,2-glycol bonds contained in the carbonyl-containing PVA resin are cut, and carbonyl groups are further introduced into the carbonyl-containing PVA resin. Accordingly, the carbonyl-containing PVA resin preferably has a 1,2-glycol bond content of 1.0 to 3.5 mol %. The expression "some of 1,2-glycol bonds" herein means not greater than 15% of the total amount of the 1,2-glycol bonds contained in the carbonyl-containing PVA resin. The 1,2-glycol bond content can be controlled by properly selecting the polymerization temperature.

Further, the carbonyl-containing PVA resin preferably contains a salt or hydroxide of a monovalent to trivalent metal in order to promote the elimination of fatty acid such as acetic acid from residual fatty acid groups adjacent to the carbonyl groups in the molecule during the melt-kneading to be described later.

Examples of the monovalent to trivalent metals include alkali metals and alkali earth metals such as sodium, magnesium, calcium, and zinc, and aluminum. Of these, at least one selected from the group consisting of sodium, magnesium, and calcium is preferred, and calcium and magnesium are particularly preferred, because the fatty acid can be efficiently eliminated from the residual fatty acid groups adjacent to the carbonyl groups in the molecule.

The salt of the monovalent to trivalent metal is preferably an aliphatic carboxylic acid salt having a carbon number of not greater than 3, because such a salt is soluble or swellable in water and/or an alcohol such as methanol to ensure easier industrial handling. Examples of the aliphatic carboxylic acid salt having a carbon number of not greater than 3 include acetic acid salts and propionic acid salts.

Specific examples of the salt and the hydroxide of the monovalent to trivalent metal include aluminum hydroxide, alkali metal salts and alkali earth metal salts such as sodium acetate, magnesium acetate, calcium acetate, calcium propionate, and zinc acetate. These may be each used alone, or two or more of these may be used in combination. Of these, magnesium acetate tetrahydrate and calcium acetate are preferred because they are soluble in water and/or methanol and ensure easier industrial handling. Particularly, magnesium acetate tetrahydrate is preferred.

The proportion of the salt or the hydroxide of the monovalent to trivalent metal is preferably 0.1 to 3 mol more preferably 0.2 to 2 mol %, still more preferably 0.2 to 1.5 mol %, based on the amount of the carbonyl-containing PVA resin. If the proportion of the salt or the hydroxide of the monovalent to trivalent metal is excessively small, the conjugated double bond generating efficiency tends to be reduced in the melt-kneading. If the proportion of the salt or the hydroxide of the monovalent to trivalent metal is excessively great, the carbonyl-containing PVA resin is liable to be decomposed in the melt-kneading.

The method for adding the salt or the hydroxide of the monovalent to trivalent metal to the carbonyl-containing PVA resin is not particularly limited. For example, the salt or the hydroxide may be added directly to a paste of the unsaponified polyvinyl ester resin, a slurry resulting from the saponification, or pellets or powder of the carbonyl-containing PVA resin. Preferably, the salt or the hydroxide is added to the slurry resulting from the saponification. Where the salt or the hydroxide of the monovalent to trivalent metal is added to the slurry resulting from the saponification, a solution or a dispersion prepared by dissolving or dispersing 3 to 15 wt. % of the salt or the hydroxide in water or an alcohol such as methanol, ethanol or propanol may be added to the slurry.

Thus, the carbonyl-containing PVA resin to be used in the production method of the present disclosure can be prepared. The form of the carbonyl-containing PVA resin is not particularly limited, but is preferably powdery from the viewpoint of workability.

The carbonyl-containing PVA resin may be used alone, or a blend of two or more such carbonyl-containing PVA resins having different properties may be use. By using the blend of the two or more carbonyl-containing PVA resins, the viscosity, the polymerization degree, the saponification degree, and the molecular weight distribution can be adjusted.

<PVA Resin Production Method>

Next, a method for producing the polyvinyl alcohol resin having an absorbance of not less than 0.2 at 280 nm according to the present disclosure will be described. The PVA resin production method of the present disclosure includes the steps of:

[1] melt-kneading the PVA resin material and extruding the resulting melt into a sheet;

[2] cooling the resulting PVA resin sheet; and

[3] pulverizing the cooled PVA resin sheet.

[Step [1]]

First, the step of melt-kneading the PVA resin material and extruding the resulting melt into a sheet will be described.

The carbonyl-containing EVA resin is preferably used as the PVA resin material, and the carbonyl-containing EVA resin is fed into an extruder and melt-kneaded.

In this step, conjugated double bonds are introduced into the PVA resin through a fatty acid elimination reaction by eliminating a fatty acid from fatty acid ester groups remaining in the carbonyl-containing PVA resin. The carbonyl-containing PVA resin is melted to be heat-treated with the use of the extruder. As a result, the randomness of the distribution of the fatty acid vinyl ester unit is improved, whereby a foaming suppressing effect is improved when the PVA resin is used as the dispersant.

The temperature for the melt-kneading is typically 175° C. to 250° C., preferably 200° C. to 240° C. If the melt-kneading temperature is excessively low, the conjugated double bond introducing efficiency tends to be reduced. If the melt-kneading temperature is excessively high, the carbonyl-containing EVA resin is liable to be decomposed, resulting in gelation. Further, scorch and other foreign matter tend to be incorporated in the resulting PVA resin.

The retention period (melt-kneading period) in the extruder is preferably 1 to 15 minutes, more preferably 2 to 10 minutes. If the melt-kneading period is excessively short, the conjugated double bond introducing efficiency tends to be reduced. If the melt-kneading period is excessively long, scorch and other foreign matter tend to be incorporated in the resulting PVA resin.

Usable as the extruder are a single-screw extruder and a twin-screw extruder, of which the twin-screw extruder is preferably used. Usable examples of the twin-screw extruder include mesh-type co-rotation twin-screw extruder, mesh-type counter-rotation twin-screw extruder, non-mesh-type twin-screw extruder, and switch-type twin-screw extruder.

Next, the melt-kneaded PVA resin is extruded into a sheet. Conventionally, the melt-kneaded PVA resin is extruded into a strand and, therefore, the productivity is lower. Further, if the extrusion rate for the extrusion into the strand is increased for improvement of the productivity, gelation is liable to occur around an extrusion part of the extruder, thereby deteriorating the long-run property. In the production method of the present disclosure, on the other hand, the melt resin sheet which is produced by extruding the melt-kneaded EVA resin into the sheet and, hence, has a greater surface area can be efficiently cooled. Therefore, the production method of the present disclosure ensures a higher productivity and an excellent long-run property.

The EVA resin sheet typically has a thickness of 1.0 to 5.0 mm, preferably 1.5 to 4.0 mm, particularly preferably 2.0 to 3.0 mm. If the thickness is excessively small, the productivity and the long-run property tend to be deteriorated. If the thickness is excessively great, a longer period of time tends to be required for the cooling, thereby reducing the productivity.

The width of the PVA resin sheet is not particularly limited, but is typically 0.1 to 2.0 m, preferably 0.15 to 1.0 m.

[Step [2]]

Next, the PVA resin sheet produced in the aforementioned manner is cooled.

Exemplary methods for cooling the PVA resin sheet include a belt cooler method, an air-cooling method, and a spot cooler method. These may be each used alone, or two or more of these may he used in combination. Particularly, a belt cooler is preferably used from the viewpoint of the cooling efficiency.

The belt cooler is a device configured so that the PVA resin sheet is fed onto a metal belt such as steel belt (e.g., a stainless steel belt) and is cooled by spouting spray water from below the belt. From the viewpoint of the cooling efficiency, the PVA resin sheet is preferably sandwiched between cooling-controlled belt coolers and cooled from opposite sides thereof. That is, the PVA resin sheet having a greater surface area is sandwiched between the cooling-controlled belt coolers from a front side and a back side thereof, whereby the PVA resin having a higher heat amount can be more efficiently cooled to a temperature that permits pulverization.

The temperature of the cooled PVA resin sheet is typically not greater than 40° C., preferably not greater than 30° C.

[Step 3]

Next, the cooled PVA resin sheet is pulverized.

The method for pulverizing the PVA resin sheet is not particularly limited. The PVA resin sheet can be pulverized by a known method. For efficient pulverization, a two-stage pulverization method is preferred. That is, the PVA resin sheet is preferably first coarsely pulverized and then finely pulverized.

Devices to be used for the coarse pulverization and the fine pulverization of the PVA resin are not particularly limited, but known devices are usable. An impact pulverizer is particularly preferred.

A typical pulverization method is, for example, such that the PVA resin is coarsely pulverized by a hammer crusher, and then the coarsely pulverized PVA resin is finely pulverized by a Makino-type pulverizer.

The pulverized PVA resin typically has an average particle diameter of 250 to 1,500 μm, preferably 350 to 1,000 μm.

The PVA resin produced by the production method of the present disclosure is useful as the dispersant (main dispersant) for the suspension polymerization of the vinyl compound, particularly vinyl chloride.

The EVA resin thus produced has an absorbance of not less than 0.2, preferably not less than 0.3, more preferably not less than 0.4, as observed at 280 nm in ultraviolet absorption spectrum measured with the use of a 0.1 wt. % aqueous solution thereof. If a PVA resin having an excessively low absorbance is used as the dispersant for the suspension polymerization of the vinyl compound, the resulting polymer tends to have a broader particle distribution with a lower polymerization stability, and coarse particles tend to occur. The upper limit of the absorbance is typically 0.7.

The absorption observed at 280 nm in the ultraviolet absorption spectrum is attributable to a —CO—(CH=CH)$_2$— structure in the PVA resin. Therefore, if the amount of the conjugated double bonds in the EVA resin is increased, the absorbance is correspondingly increased. Where the PVA resin is used as the dispersant for the suspension polymerization of the vinyl compound, the protective colloid property, the surface activity, and the like are improved.

The absorbance ratio ($A_{320}/A_{280}$) between the absorbance ($A_{320}$) and the absorbance ($A_{280}$) of the PVA resin observed at 320 nm and 280 nm, respectively, is preferably not less than 0.3, more preferably 0.45 to 1.5, still more preferably 0.5 to 1.2, particularly preferably 0.6 to 1.2, especially preferably 0.8 to 1.2. If the absorbance ratio is excessively small, the PVA resin as the dispersant tends to have a lower protective colloid property, thereby reducing the suspension polymerization stability. If the absorbance ratio is excessively great, an aqueous solution of the EVA resin is more liable to be foamed, resulting in occurrence of scale during the suspension polymerization.

The block character of the fatty acid ester groups remaining in the EVA resin is not less than 0.5, preferably not less than 0.55. If the block character is excessively low, the foaming suppressing effect in the suspension polymerization of the vinyl compound tends to be reduced.

The term "block character" means an index of the average chain length of the fatty acid ester unit present in the EVA resin. A greater value of the block character indicates that the remaining fatty acid ester blocks have a smaller average chain length (that the randomness of the fatty acid ester unit is higher).

The block character (t1) is calculated from the following expression based on the absorption intensity ratio of absorptions attributable to methylene carbons [(OH,OH) dyad absorption=43.5 to 46 ppm, (OH,OR) dyad absorption=41.0 to 43.5 ppm, and (OR,OR) dyad absorption=38 to 40.5 ppm] observed in a range of 38 to 49 ppm in $^{13}$C-NMR measurement with the use of 3-(trimethylsilyl)propionic-2,2,3,3-$d_4$-acid sodium salt) as an internal standard substance.

(η)=(OH, OR)/2(OH) (OR) wherein (OH,OR), (OH) and (OR) are each calculated in molar fraction, (OH) is a saponification degree (molar fraction) calculated based on a $^{13}$C-NMR integration ratio and, where vinyl acetate is used as the fatty acid vinyl ester, for example, (OR) is the molar fraction of acetoxy group at that time.

The block character and a block character measurement method are described in detail in Poval (published by Polymer Publishing in 1984) and in Macromolecules, 10, 532 (1977).

While the production method of the present disclosure has thus been described, the PVA resin produced by the production method of the present disclosure is particularly useful as the dispersant mainly for the suspension polymerization of vinyl chloride not by way of limitation. The PVA resin is advantageously usable as a dispersant for suspension polymerization of any vinyl compounds such as styrene, acrylate, methacrylate, and vinyl acetate.

EXAMPLES

An embodiment of the present disclosure will hereinafter be described in greater detail by way of Example.

However, it should be understood that the present disclosure be not limited to Example within the scope of the present disclosure. In the following examples, "parts" and "%" are based on weight, unless otherwise specified.

(Production of Carbonyl-Containing PVA Resin)

First, 100 parts of vinyl acetate, 1.2 parts of acetaldehyde, 4.7 parts of methanol, and 0.0092% of acetyl peroxide (APO) based on the weight of vinyl acetate were fed in a polymerization can, and the inside of the polymerization can was replaced with nitrogen. Then, polymerization was started at a boiling point with heating, and stopped when the polymerization percentage reached 91.8% after a reaction period of about 5.7 hours. Subsequently, an unpolymerized portion of vinyl acetate was removed, and a methanol solution containing 7.4 mmol of sodium hydroxide based on 1 mol of the polymerized vinyl acetate unit was added to a methanol solution (40% solution) of the resulting polymer. The polymer was saponified at 35° C. for two hours by an ordinary method, whereby a slurry (having a resin content of 12%) of a carbonyl-containing PVA resin (having a polymerization degree of 770, a saponification degree of 71.7 mol 5, and a carbonyl group amount of 0.16 mol 5) was prepared.

Next, 350 g of a 10% methanol solution of magnesium acetate tetrahydrate based on 1 kg of the carbonyl-containing PVA resin prepared in the aforementioned manner was added as a metal compound to the carbonyl-containing PVA resin, and the resulting mixture was stirred at 25° C. for one hour. Thereafter, the resulting product was filtered out and dried, whereby a carbonyl-containing PVA resin containing 1.25 mol % of magnesium acetate was prepared.

Example 1

The carbonyl-containing PVA resin thus prepared was fed into a twin-screw extruder to be melt-kneaded under the following production conditions and extruded into a sheet.

The resulting PVA resin sheet was sandwiched between two belt coolers (available from Nippon belting Co., Ltd.) from opposite sides thereof to be thereby cooled. Thereafter, the resulting sheet was pulverized by means of a hammer crusher (available from Makino Manufacturing Co., Ltd.) and a Makino type pulverizer (available from Makino Manufacturing Co., Ltd.), whereby a particulate PVA resin having an average particle diameter of 850 μm was produced.

[Production Conditions]
<Melt-Kneading Conditions>

By means of a twin-screw extruder (TEM-58 available from Toshiba Machine Co., Ltd. and having an L/D ratio of L/D=45), the PVA resin was melt-kneaded, while the resin temperature was set at a predetermined temperature. Temperature settings:
C1/C2/C3/C4/C5/C6/C7/C8/C9/C10/H1/D1/D2/D3 =50/200/200/200/220/230/230/240/240/240/240/240/230/240° C.
Screw rotation speed: 240 rpm
Extrusion rate: 250 kg/hour
Resin temperature: 245° C.
C4 side feeder
Orifice: Sheet-shaped
<Cooling Conditions>

With the use of the two belt coolers (available from Nippon Belting Co., Ltd.), the PVA resin sheet was cooled with its thickness and width adjusted to 2.5 mm and 200 mm, respectively.
Belt speed: 9 m/minute
Cooling temperature (upper and lower belts): 35° C.
<Pulverization Conditions>

The PVA resin sheet was coarsely and finely pulverized by means of the hammer crusher and the Makino type pulverizer (available from Makino Manufacturing Co., Ltd.), whereby the particulate PVA resin was produced.
Hammer crusher: a rotation speed of 2,500 rpm and a screen diameter of 6 mm
Makino type pulverizer: a rotation speed of 5,600 rpm and a screen diameter of 3 mm Comparative Example 1

A particulate PVA resin of Comparative Example 1 was produced in substantially the same manner as in Example except that the PVA resin was melt-kneaded and extruded into a strand at an extrusion rate of 100 kg/hour under the following conditions, and then the resulting strand was air-cooled.
<Melt-Kneading Conditions>
Temperature settings:
C1/C2/C3/C4/C5/C6/C7/C8/C9/C10/H1/D1/D2/D3 =50/90/170/180/190/200/210/210/210/210/210/210/210/210° C.
Screw rotation speed: 100 rpm
Extrusion rate: 100 kg/hour
Resin temperature: 220° C.
C4 side feeder
Orifice: Strand-shaped Comparative Example 2

A particulate PVA resin of Comparative Example 2 was produced in substantially the same manner as in Comparative Example 1, except that the PVA resin was melt-kneaded and extruded into a strand at an extrusion rate of 250 kg/hour under the following conditions.
<Melt-Kneading Conditions>
Temperature settings:
C1/C2/C3/C4/C5/C6/C7/C8/C9/C10/H1/D1/D2/D3 =50/200/200/200/220/230/230/240/240/240/240/240/230/240° C.
Screw rotation speed: 240 rpm
Extrusion rate: 250 kg/hour
Resin temperature: 245° C.
C4 side feeder
Orifice: Strand-shaped Example 1 and Comparative Examples 1 and 2 were evaluated in the following manner, and the results are shown blow in Table 1.

[Long-Run Property]

In Example 1 and Comparative Examples 1 and 2, the extrusion part of the extruder was visually checked for the occurrence of gelation when the carbonyl-containing PVA resin was melt-kneaded and extruded under the aforementioned conditions continuously for 8 hours, and Example 1 and Comparative Examples 1 and 2 were each evaluated based on the following criteria:

[Evaluation Criteria]
○ (very good): Gelation did not occur.
x (Poor) : Gelation occurred.

[Absorbance]

The produced particulate PVA resins were each dissolved in water for preparation of a 0.1% aqueous solution, which was used as a sample for measurement of absorbance. The absorbance of the sample was measured at a wavelength of 280 nm with the use of an ultraviolet-visible-near infrared spectrophotometer (V-560 available from JASCO Corporation). A sample container (cell) herein used had a thickness of 1 cm.

TABLE 1

|  | Extrusion shape | Extrusion rate (kg/hour) | Cooling method | Long-run property | Absorbance (at 280 nm) |
|---|---|---|---|---|---|
| Example 1 | Sheet | 250 | Belt coolers | ○ | 0.55 |
| Comparative Example 1 | Strand | 100 | Air-cooled | ○ | 0.35 |
| Comparative Example 2 | Strand | 250 | Air-cooled | x | 0.55 |

The results shown above in Table 1 indicate that the production method of Example 1 ensured not only a higher productivity with a higher extrusion rate but also an excellent long-run property, and the PVA resin prepared in Example 1 had an absorbance of not less than 0.2 at 280 nm.

On the other hand, the production method of Comparative Example 1, in which the melt-kneaded PVA resin was extruded into a strand, was poorer in productivity with a lower extrusion rate.

Further, the production method of Comparative Example 2 suffered from gelation around the extrusion part of the extruder and, therefore, was poorer in long-run property, although ensuring a higher productivity with a higher extrusion rate.

The PVA resin produced by the production method of Example 1 is useful as the dispersant for the suspension polymerization of the vinyl compound.

While a specific form of the embodiment of the present disclosure has been shown in the aforementioned example, the example is merely illustrative but not limitative. It is contemplated that various modifications apparent to those skilled in the art could be made within the scope of the disclosure.

The method for producing the PVA resin according to the present disclosure ensures a higher productivity and an excellent long-run property, and the PVA resin produced by the method of the present disclosure is useful as the dispersant for the suspension polymerization of vinyl chloride.

The invention claimed is:

1. A method for producing a polyvinyl alcohol resin having an absorbance of not less than 0.2 at 280 nm, the polyvinyl alcohol resin production method comprising:
    melt-kneading a polyvinyl alcohol resin material and extruding a resulting melt into a polyvinyl alcohol resin sheet;
    cooling the polyvinyl alcohol resin sheet; and
    pulverizing the cooled polyvinyl alcohol resin sheet;
    wherein the cooling the polyvinyl alcohol resin sheet comprises sandwiching the polyvinyl alcohol resin sheet between belt coolers for the cooling.

2. The polyvinyl alcohol resin production method according to claim 1, wherein the polyvinyl alcohol resin material is a carbonyl-containing polyvinyl alcohol resin.

3. The polyvinyl alcohol resin production method according to claim 1, wherein the polyvinyl alcohol resin is a polyvinyl alcohol resin to be used as a dispersant for suspension polymerization of a vinyl compound.

* * * * *